June 24, 1930.  E. V. ANDERSON  1,767,038
BALANCED COKE QUENCHING VALVE
Filed Feb. 3, 1927
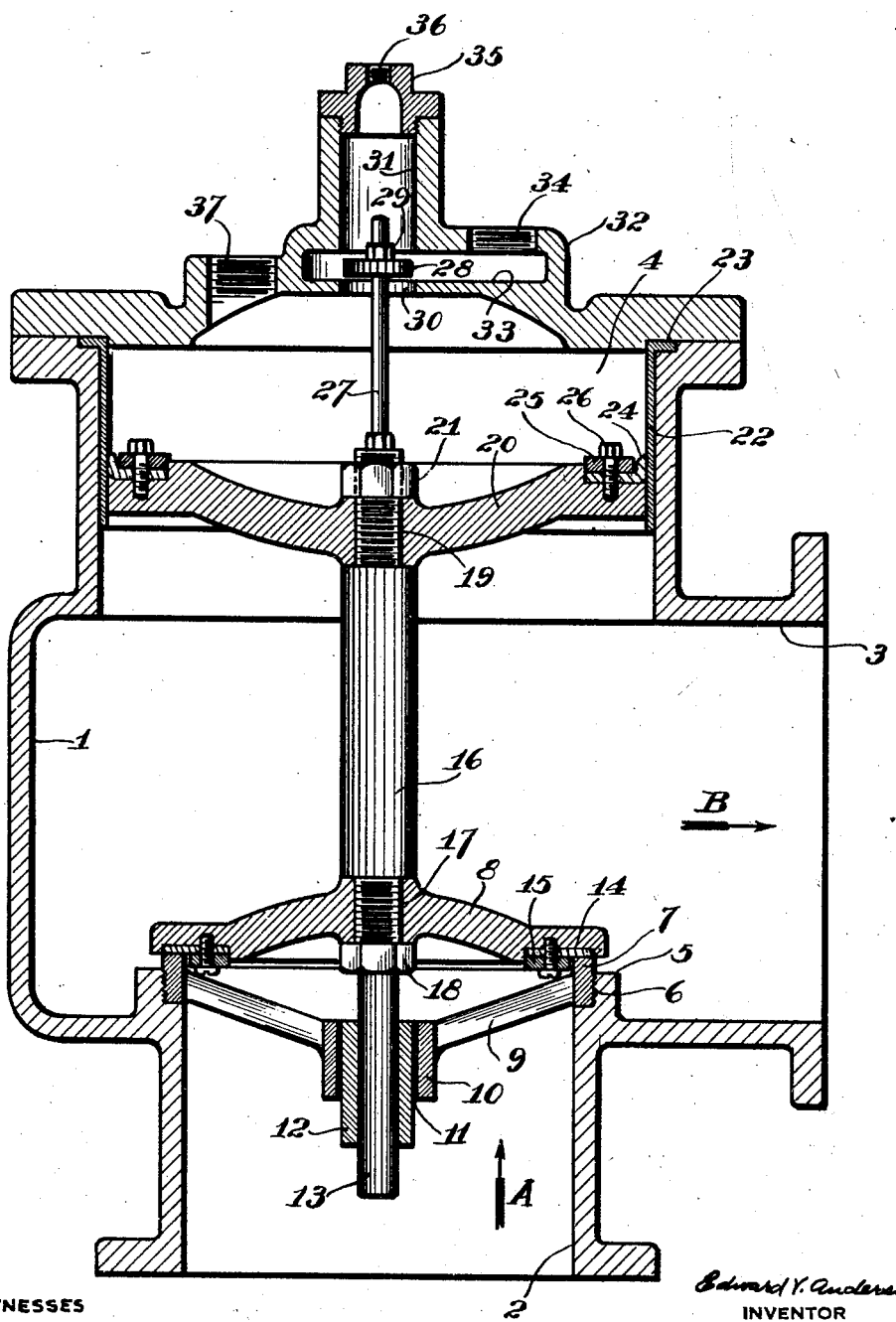
WITNESSES  
INVENTOR  
Edward V. Anderson  
by Winter Brown + Critchlow  
his attorneys.

the valve will raise the valve member 8 off

UNITED STATES PATENT OFFICE

EDWARD V. ANDERSON, OF BELLE VERNON, PENNSYLVANIA, ASSIGNOR OF ONE-HALF TO CHARLES E. GOLDEN, OF CRAFTON, PENNSYLVANIA

BALANCED COKE-QUENCHING VALVE

Application filed February 3, 1927. Serial No. 165,642.

This invention relates to hydraulic valve mechanism, more particularly to fluid pressure operated valves for use in coke quenching systems.

It is among the objects of this invention to provide a balanced double cushioned, fluid-pressure operated valve mechanism of simple and durable mechanical construction which shall be adapted to automatically cut off or reduce the fluid pressure operating to seat the valve at or near the instant of the valve closing upon its seat.

Another object of the invention is to provide a valve mechanism adapted to be operated by fluid pressure in which the valve travels at a uniform rate of speed for the major distance of its closing stroke, and is then automatically retarded in its final seating movement.

In the accompanying drawings constituting a part hereof and in which like reference characters designate like parts the single figure is a vertical sectional view partially in elevation of a valve mechanism embodying the principles of this invention.

In the drawing the valve body or casing is designated by the reference numeral 1 and is provided with openings 2, 3, and 4 constituting respectively the inlet, outlet and the main valve chamber. The valve is provided with an inwardly projecting boss 5 of annular shape provided with a threaded portion 6 which is adapted to interact with an annulus 7 that constitutes the seat of a valve 8. The member 7 is provided with radial arms 9 which terminate in a hub portion 10 having an opening 11 adapted to receive a bushing 12 which engages a depending stem portion 13 of the valve member. The valve 8 is provided with a seating ring 14 secured by a follower 15, and is secured to or formed integrally with a valve stem 16.

As shown in the drawing the member 8 is mounted on a shoulder portion 17 of the stem 16 and is secured in place by a nut 18. The opposite end of the stem 16 is likewise provided with a shoulder portion 19 for mounting a piston member 20 which is secured to the stem by a nut 21. The piston 20 cooperates with a cylindrical liner 22 provided with a flange portion 23 that seats in a counter-bore or recess formed concentrically with the opening 4 of the valve casing. A piston cup 24 adapted to engage the liner 22 is mounted on the piston 20 and secured thereto by a cup follower 25 and screw bolts 26.

Secured to the upper end of the valve stem 16 or formed integrally therewith, as the case may be, is a constricted stem portion 27 provided with a piston valve 28 which is secured near the upper end thereof by a nut 29. The valve 28 is in alignment with a port 30 and operates in a cylinder 31 provided in the cover member 32 of the valve. A passage 33 communicating with the port 30 and cylinder 31 is provided in the cover 32 and a threaded opening 34 communicating with the passage 33 is provided therein and adapted to receive a fluid pressure regulating valve which establishes communication with the passage 33 and a source of fluid pressure (not shown). A cap 35 having an opening 36 therein is secured to the upper portion of the cylinder 31 and an outlet opening 37 is provided in the cover member. These may be used for blow-off purposes in cleaning the valve. They have no operative function. Ordinarily the opening 37 is closed with a plug.

The operation of the valve mechanism herein described is briefly as follows: Assuming the passages 34 and 37 in the valve head to be closed by manually adjustable valves (not shown) and the valve mechanism in the position illustrated in the drawings, which is the closed position of the valve 8, if it is desired to open the valve, the passage 37 is opened by its control valve to provide an outlet for the fluid that is contained above the piston member 20. The primary pressure on the inlet side A of the valve will raise the valve member 8 off its seat 7 to open the main passage to permit a flow from A to B.

To lower the valve 8 on its seat 7 for closing the main valve passage the valve controlling the passage 37 is closed and the valve controlling the inlet passage 34 is opened.

The opening of the valve controlling the passage 34 will establish communication of the passage 33 with a source of fluid pressure which is conducted through the ports 30 to the piston member 20. When the main passage controlling valve 8 is in its open position the piston 28 is disposed in the upper region of its cylinder 31 and the port 30 is unobstructed to the flow of fluid. The relative areas of the piston 20 and the valve member 8 are such that the pressure exerted on the piston 20 readily overcomes the resistance encountered by the valve in counteracting the primary pressure on the inlet side of the main valve passage.

As the valve 8 approaches its seat 7, with the downward movement of the piston member 20, the small piston member 28 approaches the port 30. Consequently the flow of fluid through the passage 33 and port 30 is gradually reduced. This produces a substantial slowing-up of the piston valve 8 in its downward movement, thus causing the valve 8 to seat without water hammer or shock.

To open the main passage valve 8 the valve controlling the passage 34 is closed to shut off pressure above the piston member 20, and the outlet port 37 is opened to release the pressure in the cylinder chamber. The pressure acting against the underside of the valve 8 will then be effective in lifting the valve from its seat 7 to open the main passage. This opening movement is gradually effected on account of the resistance of the fluid in the cylinder chamber above the piston 20 which must escape gradually through the passage 37.

It is evident from the foregoing description of this invention that a double cushioned valve made in accordance therewith is amply cushioned in its opening and closing operations. The automatic means provided for cutting off the pressure available for closing the valve is obviously simple in construction and positive in its function of retarding the passage controlling valve in its closing movement.

Although a specific embodiment of the invention has been herein illustrated and described various modifications may be made in the details of construction without departing from the principles thereof.

I claim:

1. A valve mechanism comprising in combination, a casing having a passage therethrough, a valve controlling the passage, a fluid actuated piston for operating said valve in its passage controlling movement, and means associated with said valve for graduating the fluid pressure acting upon said piston, said valve, piston, and regulating means being mounted on a common central stem.

2. A valve mechanism comprising in combination, a casing having a passage therethrough, a valve controlling the passage, a fluid actuated piston for actuating said valve, and a second piston for controlling the fluid pressure acting upon said first named piston, said valve and pistons being joined to and movable with said valve.

3. A valve mechanism comprising in combination, a casing having a passage therethrough, a valve controlling the passage, a fluid actuated piston for actuating said valve, and a second piston for controlling the fluid pressure acting upon said first named piston, said valve and pistons being arranged in superposed relation and jointly movable by movement of said valve.

4. A valve mechanism comprising in combination, a casing having a passage therethrough, a valve controlling said passage, a cover for said casing having a cylindrical chamber therein, and having a port communicating with a source of fluid pressure, a fluid actuated piston secured to said valve, and a second piston disposed in said cylindrical chamber and secured to said first named piston to be movable therewith, said last named piston being adapted for controlling said port to regulate the fluid pressure acting upon said first named piston.

5. A valve mechanism comprising in combination, a casing having a passage therethrough, a valve controlling said passage, a cover for said casing having a port communicating with a source of pressure, a pressure actuated piston secured to said valve, and a second piston secured to said valve and adapted to control said port, said last named piston being in spaced relation to the valve to regulate the pressure acting on said first named piston in accordance with the relative position of the valve to its seat.

In testimony whereof, I sign my name.

EDWARD V. ANDERSON.